United States Patent
Halder et al.

(10) Patent No.: US 10,077,054 B2
(45) Date of Patent: *Sep. 18, 2018

(54) TRACKING OBJECTS WITHIN A DYNAMIC ENVIRONMENT FOR IMPROVED LOCALIZATION

(71) Applicant: Ford Global Technologies, LLC., Dearborn, MI (US)

(72) Inventors: Bibhrajit Halder, Palo Alto, CA (US); Scott Varnhagen, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/487,184

(22) Filed: Apr. 13, 2017

(65) Prior Publication Data

US 2017/0217434 A1 Aug. 3, 2017

Related U.S. Application Data

(63) Continuation of application No. 15/010,303, filed on Jan. 29, 2016, now Pat. No. 9,707,961.

(51) Int. Cl.
*B60W 40/04* (2006.01)
*G05D 1/02* (2006.01)
(Continued)

(52) U.S. Cl.
CPC ............ *B60W 40/04* (2013.01); *B60W 30/08* (2013.01); *B60W 50/0097* (2013.01);
(Continued)

(58) Field of Classification Search
CPC ..... B60W 2050/0089; B60W 2550/10; B60W 2550/30; B60W 30/08; B60W 30/0953; B60W 30/0956; B60W 40/04; B60W 50/0097; G05D 1/024; G05D 1/0246; G05D 1/0257; G05D 1/027; G05D 1/0274
(Continued)

(56) References Cited

U.S. PATENT DOCUMENTS 8,112,225 B2 2/2012 Eidehall
8,355,539 B2 1/2013 Tan
(Continued)

FOREIGN PATENT DOCUMENTS

WO WO-2012167301 A1 12/2012

*Primary Examiner* — Tyler J Lee
(74) *Attorney, Agent, or Firm* — David R. Stevens; Stevens Law Group

(57) ABSTRACT

The present invention extends to methods, systems, and computer program products for tracking objects within a dynamic environment for improved localization. Sensing devices are utilized to gather data about a vehicle's environment. In cases where the sensor data has become degraded, such as data indicating that lane lines have become degraded, obscured, or nonexistent, the vehicle computer system uses previously detected sensor data to estimate the speed and direction of travel of moving objects. The computer system then estimates the location of the moving objects after a specified period of time based on the estimated speed and direction of the moving object. The computer system utilizes this information to localize the vehicle within the dynamic environment and to control the configuration of the vehicle.

20 Claims, 6 Drawing Sheets

(51) Int. Cl.
*B60W 50/00* (2006.01)
*B60W 30/08* (2012.01)
*B60W 30/095* (2012.01)

(52) U.S. Cl.
CPC ............. *G05D 1/024* (2013.01); *G05D 1/027* (2013.01); *G05D 1/0246* (2013.01); *G05D 1/0257* (2013.01); *G05D 1/0274* (2013.01); *B60W 30/0953* (2013.01); *B60W 30/0956* (2013.01); *B60W 2050/0089* (2013.01); *B60W 2550/10* (2013.01); *B60W 2550/30* (2013.01)

(58) Field of Classification Search
USPC .......................................................... 701/23
See application file for complete search history.

(56) References Cited

U.S. PATENT DOCUMENTS

| | | |
|---|---|---|
| 8,532,862 B2 | 9/2013 | Neff |
| 8,615,109 B2 | 12/2013 | Shimizu |
| 9,804,599 B2 * | 10/2017 | Kentley-Klay ...... G05D 1/0088 |
| 2010/0106356 A1 * | 4/2010 | Trepagnier ............ G01S 17/023 |
| | | 701/25 |
| 2011/0282581 A1 * | 11/2011 | Zeng ..................... G01S 17/936 |
| | | 701/301 |
| 2013/0190981 A1 * | 7/2013 | Dolinar ................... B60R 11/04 |
| | | 701/41 |
| 2014/0032108 A1 * | 1/2014 | Zeng ..................... G08G 1/167 |
| | | 701/533 |
| 2015/0032290 A1 | 1/2015 | Kitahama |
| 2015/0032295 A1 * | 1/2015 | Stark ...................... G05D 1/101 |
| | | 701/3 |
| 2015/0134234 A1 | 5/2015 | Kim |
| 2015/0310146 A1 * | 10/2015 | Tanzmeister ........... G08G 1/167 |
| | | 703/2 |
| 2016/0121907 A1 * | 5/2016 | Otake ................... B60W 50/14 |
| | | 701/23 |
| 2017/0120902 A1 * | 5/2017 | Kentley ................ B60W 10/04 |
| 2017/0168492 A1 * | 6/2017 | Shitamoto ............ G05D 1/0223 |
| 2017/0213462 A1 * | 7/2017 | Prokhorov ........ G08G 1/096791 |

* cited by examiner

TRACKING OBJECTS WITHIN A DYNAMIC ENVIRONMENT FOR IMPROVED LOCALIZATION

CROSS-REFERENCE TO RELATED APPLICATIONS

This application is a continuation of and claims the benefit of and priority to U.S. patent application Ser. No. 15/010,303, entitled "Tracking Objects Within A Dynamic Environment For Improved Localization", filed Jan. 29, 2016 by Bibhrajit Halder et al., the entire contents of which are expressly incorporated by reference.

BACKGROUND

1. Field of the Invention

This invention relates generally to the field of vehicle navigation systems, and, more particularly, to vehicle navigation systems which can be utilized when lane line markings have become degraded, obscured, or are nonexistent.

2. Related Art

Active safety and driver assist features such as lane departure warning, low-speed lane keeping (Traffic Jam Assist—TJA), high speed lane keeping (Highway Assist—HA) as well as fully autonomous vehicle operation rely upon localization of the vehicle within the lane to provide their functionality. Localization is defined as a computational problem of constructing or updating a map of an unknown environment while simultaneously keeping track of a vehicle's location within it. In general, each of these systems relies upon multiple sensor suites to provide robust and accurate positioning. Examples of currently relied upon sensor suites are: camera, stereo cameras, Global Positioning System (GPS), and LIDAR. However, in instances when lane lines become degraded, obscured, or are nonexistent, the camera and LIDAR based solutions are prone to failure. In addition, GPS on its own is not accurate enough for lane-level localization and is prone to dropping out as a result of urban or natural canyon scenarios.

To facilitate the continued use of these active safety/driver assist features during occasions when positioning sensors operate in a high error or even failed state it is possible to dead reckon based on the last known position, as well as knowledge of the trajectory of the vehicle. It is possible to perform this reckoning using the vehicle on-board Inertial Measurement Unit (IMU) sensors, which are a suite of body fixed accelerometers and gyroscopes used to estimate vehicle velocity states. However, when integrating these signals in an effort to estimate position states, small bias errors can quickly accumulate into large position estimation errors.

An improved reckoning of position state can be achieved via odometry from the vehicle's four wheel-speed sensors. While these sensors provide a robust estimate of longitudinal position, they are unable to accurately estimate lateral position changes of the vehicle. Thus, in the event of faulty or nonexistent lane level perception data, limited, if any, solutions exist for continued operation of the aforementioned active safety and vehicle assist features.

BRIEF DESCRIPTION OF THE DRAWINGS

The specific features, aspects and advantages of the present invention will become better understood with regard to the following description and accompanying drawings where.

DETAILED DESCRIPTION

Figure 1:
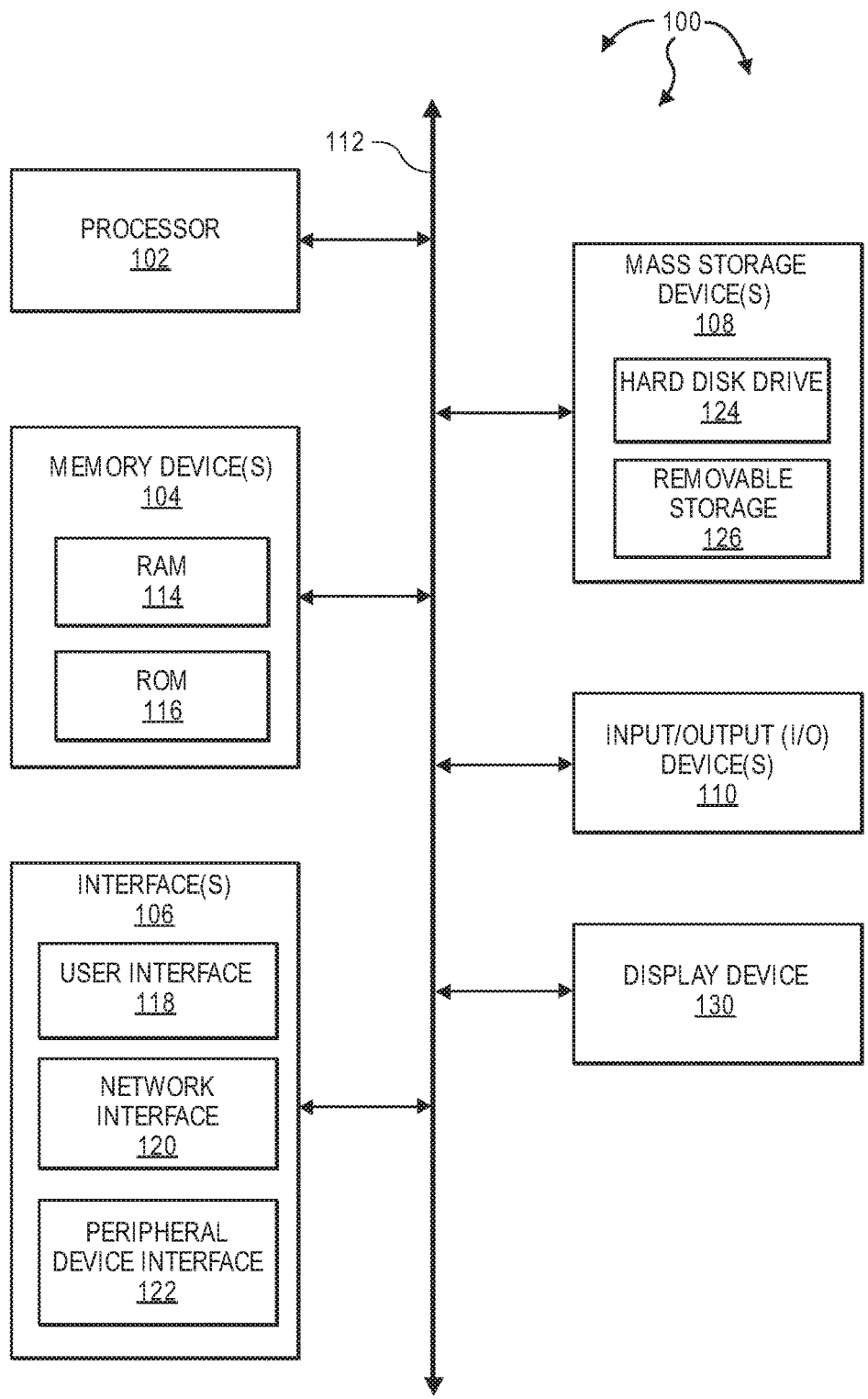
FIG. 1 illustrates an example block diagram of a computing device.

The present invention extends to methods, systems, and computer program products for tracking objects within a dynamic environment for improved localization.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered Storage, such as FusionIO). Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service (SaaS), Platform as a Service (PaaS), Infrastructure as a Service (IaaS), and deployment models (e.g., private cloud, community cloud, public cloud, hybrid cloud, etc.). Databases and servers described with respect to the present invention can be included in a cloud model.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

In this description and the following claims, a "vehicle configuration" is defined as the configuration of a vehicle including one or more of: vehicle acceleration, vehicle velocity, vehicle position, and vehicle direction.

In general, aspects of the invention are directed to tracking objects within a dynamic environment for improved localization. Sensing devices are utilized to gather data about a vehicle's environment. In cases where the sensor data has become degraded, such as data indicating that lane lines have become degraded, obscured, or are nonexistent, a vehicle computer system uses previously detected sensor data to estimate the speed and direction of travel of dynamic (e.g., moving) objects. The computer system then estimates the location of the dynamic objects after a specified period of time based on the estimated speed and direction of the dynamic objects. The computer system utilizes this information, as well as currently measured static objects, to localize the vehicle within the dynamic environment and to control the configuration of the vehicle.

FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

In one aspect, a vehicle is outfitted with one or more radar systems. The one or more radar systems can be included in active safety and driver assist features such as lane departure warning, low-speed lane keeping (Traffic Jam Assist—TJA), high speed lane keeping (Highway Assist—HA), adaptive cruise control, etc. The one or more radar systems can be leveraged to improve position estimation and localization, supplement other perception sensor suites, and improve the robustness of active safety/driver assist systems as a whole.

As such, distance measuring sensors such as radar/LIDAR can be used to aid in position estimation and localization. Measurements can be taken at discrete points in time and compared to one another. By comparing (e.g., two consecutive) scans, it is possible to estimate a vehicle's motion in time. Methods of comparison can include but are not limited to: iterative closest point (ICP). To better account for dynamic (e.g., moving) objects, evaluation of radar/LIDAR scans can: (1) estimate the speed and direction of travel of dynamic objects, (2) propagate these dynamic objects forward by the amount of time between two scans of the distance measuring sensors, and (3) consider propagated objects from the previous scan, as well as currently measured static objects, for the localization algorithm.

These and other similar operations can be performed by an in-vehicle computer system to enable more robust position reckoning within a dynamic roadway environment. Sensor suites including but not limited to radar and ultrasonic sensors, as well as LIDAR and Camera sensors utilizing post processing techniques, can be used to estimate speed and direction of travel of dynamic (e.g., moving) objects. Algorithms including but not limited to: clustering techniques, nearest closest point methods, as well as Kalman filter techniques can be used to propagate dynamic objects between sensor scans. Accordingly, by leveraging the estimated trajectories of dynamic objects, the dynamic objects can be propagated forward in time, allowing for more accurate position reckoning for a vehicle.

Figure 2:
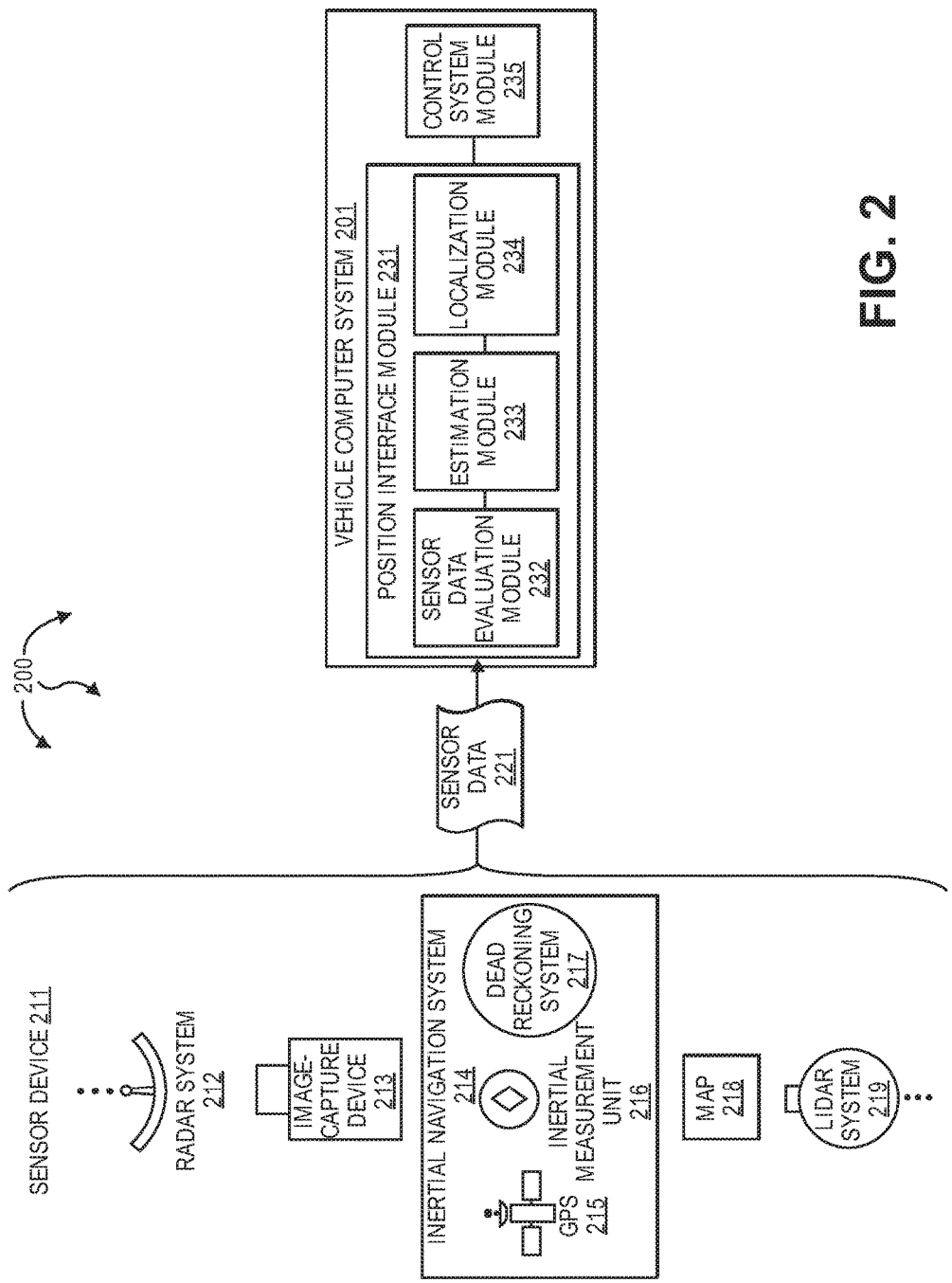
FIG. 2 illustrates an example computer architecture that facilitates tracking objects within a dynamic environment for improved localization.

FIG. 2 illustrates an example computer architecture in a vehicle 200 that facilitates tracking objects within a dynamic environment for improved localization. Vehicle 200 can be a motorized vehicle, such as, for example, a car, a truck, a bus, or a motorcycle. Referring to FIG. 2, vehicle 200 includes vehicle computer system 201 and sensor devices 211. Each of the computer system 201 and sensor devices 211, as well as their respective components, can be connected to one another over (or be part of) a network, such as, for example, a PAN, a LAN, a WAN, a controller area network (CAN) bus or other in-vehicle bus, and even the Internet. Accordingly, each of the computer system 201 and sensor devices 211, as well as any other connected computer systems and their components, can create message related data and exchange message related data (e.g., near field communication (NFC) payloads, Bluetooth packets, Internet Protocol (IP) datagrams and other higher layer protocols that utilize IP datagrams, such as, Transmission Control Protocol (TCP), Hypertext Transfer Protocol (HTTP), Simple Mail Transfer Protocol (SMTP), etc.) over the network.

Sensor devices 211 can include a radar system 212, a image-capture device 213, a inertial navigation system 214, a map 218, and a LIDAR system 219. Inertial navigation system 214 can further including a global positioning system (GPS) 215, an inertial measurement unit (IMU) 216, and a dead reckoning (DR) system 217. Other types of sensor devices (not shown), such as, for example, ultrasonic sensors and infrared sensors, can also be included in sensor devices 211. Each of the sensor devices is configured to capture sensor data of a specified type by sensing objects in the vicinity of vehicle 200. For example, image-capture device 213 is configured to capture image data, LIDAR system 219 is configured to capture LIDAR data, and so forth.

Each of the respective types of sensor data can be transmitted to vehicle computer system 201.

As depicted, vehicle computer system 201 includes an interface position module 231 and a control system module 235. Interface position module 231 is configured to receive sensor data from sensor devices 211. Interface position module 231 further includes a sensor data evaluation module 232, an estimation module 233, and a localization module 234.

Sensor data evaluation module 232 is configured to process and evaluate sensor data received from sensor devices 211. For example, sensor data evaluation module 232 can process sensor data to identify road lane markings, objects in the vehicle environment, including static and dynamic (e.g., moving) objects, and information about the vehicle's configuration, including position on the road, trajectory, and velocity. Furthermore, sensor data evaluation module 232 can determine when road lane markings have become degraded, obscured, or are nonexistent.

Estimation module 233 is configured to utilize sensor data to identify both static and dynamic objects in the vehicle environment. Accordingly, when sensor data evaluation module 232 determines that road lane markings are degraded, obscured, or are non-existent, estimation module 233 can utilize sensor data to identify static and dynamic objects in an area around vehicle 200. Furthermore, estimation module 233 is configured to estimate the speed and direction of travel of dynamic objects at different time steps.

Localization module 234 is configured to utilize the results of estimation module 233 to determine position reckoning for improved localization of vehicle 200 within an environment containing other static and/or dynamic objects. Control system module 235 is configured to utilize the localization results of position interface module 231 to control the vehicle's configuration; including the vehicle's location, trajectory, and velocity.

Figure 3:
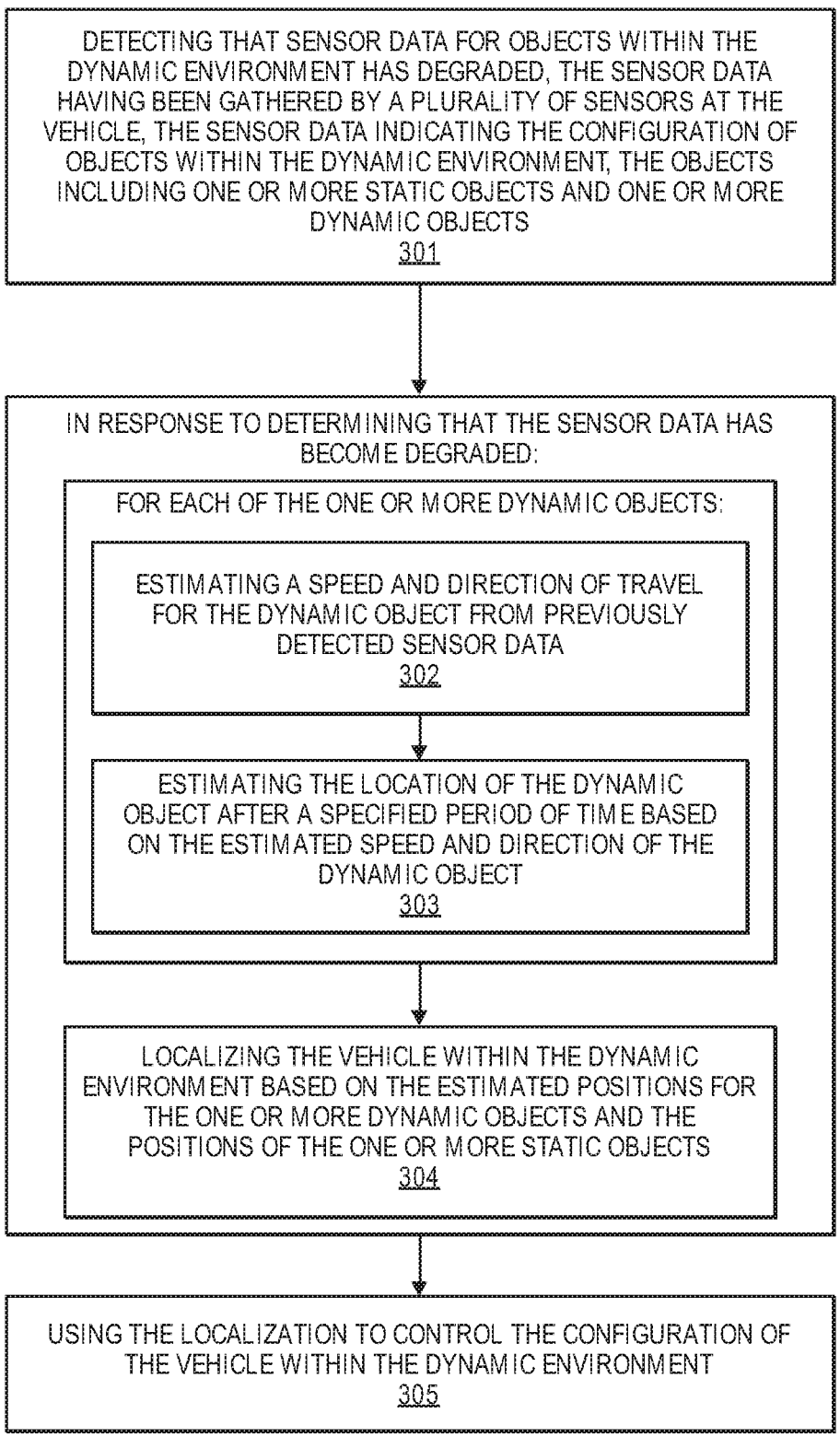
FIG. 3 illustrates a flow chart of an example method for tracking objects within a dynamic environment for improved localization.

FIG. 3 illustrates a flow chart of an example method 300 for tracking objects within a dynamic environment for improved localization. Method 300 will be described with respect to the components and data of computer architecture 200.

As vehicle 200 moves on a roadway, each of the sensing devices 211 can sense road marking information as well as static and dynamic objects in an environment around vehicle 200. For example, image-capture device 213 can capture image data of other objects within the environment, LIDAR system 219 can capture LIDAR data of other objects within the environment, and so forth. Each of the respective types of data can be combined in sensor data 221. Thus, sensor data 221 can indicate the configuration of any static objects and/or dynamic objects within and/or around a portion of roadway where vehicle 200 is traveling.

Static objects can include signs, posts, mile markers, street lights, trees, medians, guard rails, rocks, stationary (e.g., parked) vehicles, road construction equipment, etc. Dynamic objects can include other moving vehicles, pedestrians, cyclists, etc.

Sensor devices 211 can transmit sensor data 221 to vehicle computer system 201. Position interface module 231 can receive sensor data 221 from sensor devices 211.

Method 300 includes detecting that sensor data for objects within the dynamic environment has degraded, the sensor data having been gathered by a plurality of sensors at the vehicle, the sensor data indicating the configuration of objects within the dynamic environment, the objects including one or more static objects and one or more dynamic objects (301). For example, sensor data evaluation module 232 can detect that sensor data 221 has degraded. Sensor data evaluation module 232 can process and evaluate sensor data 221 to identify road lane markings, static objects in the vehicle environment, dynamic objects in the vehicle environment, and information about the vehicle's configuration. From processing and evaluation, sensor data evaluation module 232 can determine when road lane markings have become degraded, obscured, or are non-existent (and thus may inhibit the operation of other automated systems of vehicle 200, such as, for example, a lane assist system).

In response to detecting that the sensor data has become degraded, for each of the one or more dynamic objects, method 300 includes estimating a speed and direction of travel for the dynamic object from previously detected sensor data (302). For example, estimation module 233 can utilize sensor data 221 to estimate the speed and direction of travel other dynamic objects within and/or around the portion of roadway where vehicle 200 is traveling.

For any dynamic objects, estimation module 233 can estimate the speed and direction of travel of the dynamic objects at different time steps. For example, estimation module 233 can utilize sensor data 221 (e.g., from distance measuring sensors such as radar and/or LIDAR) to aid in speed and direction estimation. To do this, estimation module 233 can compare sensor measurements taken at two discrete points in time. Estimation module 233 can compare the two consecutive scans to estimate speed and direction of travel for one or more dynamic objects. Methods of comparison can include iterative closest point (ICP) as well as other algorithms.

In response to determining that the sensor data has become degraded, for each of the one or more dynamic objects, method 300 includes estimating the location of the dynamic object after a specified period of time based on the estimated speed and direction of the dynamic object (303). For example, estimation module 233 can estimate the location of one or more dynamic objects within and/or around the portion of roadway where vehicle 200 is traveling after a specified period of time. Estimated locations for each dynamic object can be calculated based on estimated speed and direction for the dynamic object.

In response to determining that the sensor data has become degraded, method 300 includes localizing the vehicle within the dynamic environment based on the estimated positions for the one or more moving objects and the positions of the one or more static objects (304). For example, localization module 234 can utilize the results from estimation module 233 to localize vehicle 200 within and/or around the portion of roadway where vehicle 200 is traveling. Localization can be based on estimated positions for other dynamic objects and/or other static objects within and/or around the portion of roadway where vehicle 200 is traveling.

Position interface module 231 can send the localization of vehicle 200 to control system module 235. Control system module 235 can receive the localization of vehicle 200 from position interface module 231.

In one aspect, position interface module 231 essentially creates a map of a dynamic environment, such as, for example, other dynamic objects and/or other static objects within and/or around the portion of roadway where vehicle 200 is traveling. The map can be based on one or more of a lane marking on the road, a geographic location of the vehicle, and a predetermined map of the road. A new position for dynamic objects (e.g., other moving vehicles) can also be calculated based on an initial position and an initial velocity of the dynamic objects and based on a specified period of time.

Method 300 includes using the localization to control the configuration of the vehicle within the dynamic environment (305). For example, control system module 235 can use the location of vehicle 200 to control the configuration of vehicle 200 within and/or around the portion of roadway where vehicle 200 is traveling. Controlling the configuration of vehicle 200 can include accelerating, decelerating, maintaining speed, changing direction, maintaining direction, braking, etc. Control system module 235 can control other vehicle systems, such as, for example, cruise control, to control the configuration of vehicle 200.

Accordingly, position interface module 231 can: (1) estimate the speed and direction of travel of dynamic objects, (2) calculate the predicted location of the dynamic objects by propagating the dynamic objects between sensor scans, and (3) utilize the predicted locations of dynamic objects as well as locations static objects to compensate for degraded, obscured, or nonexistent lane markings. As such, aspects of the invention include robust position reckoning within a dynamic environment in where a vehicle is operating.

Figure 4:
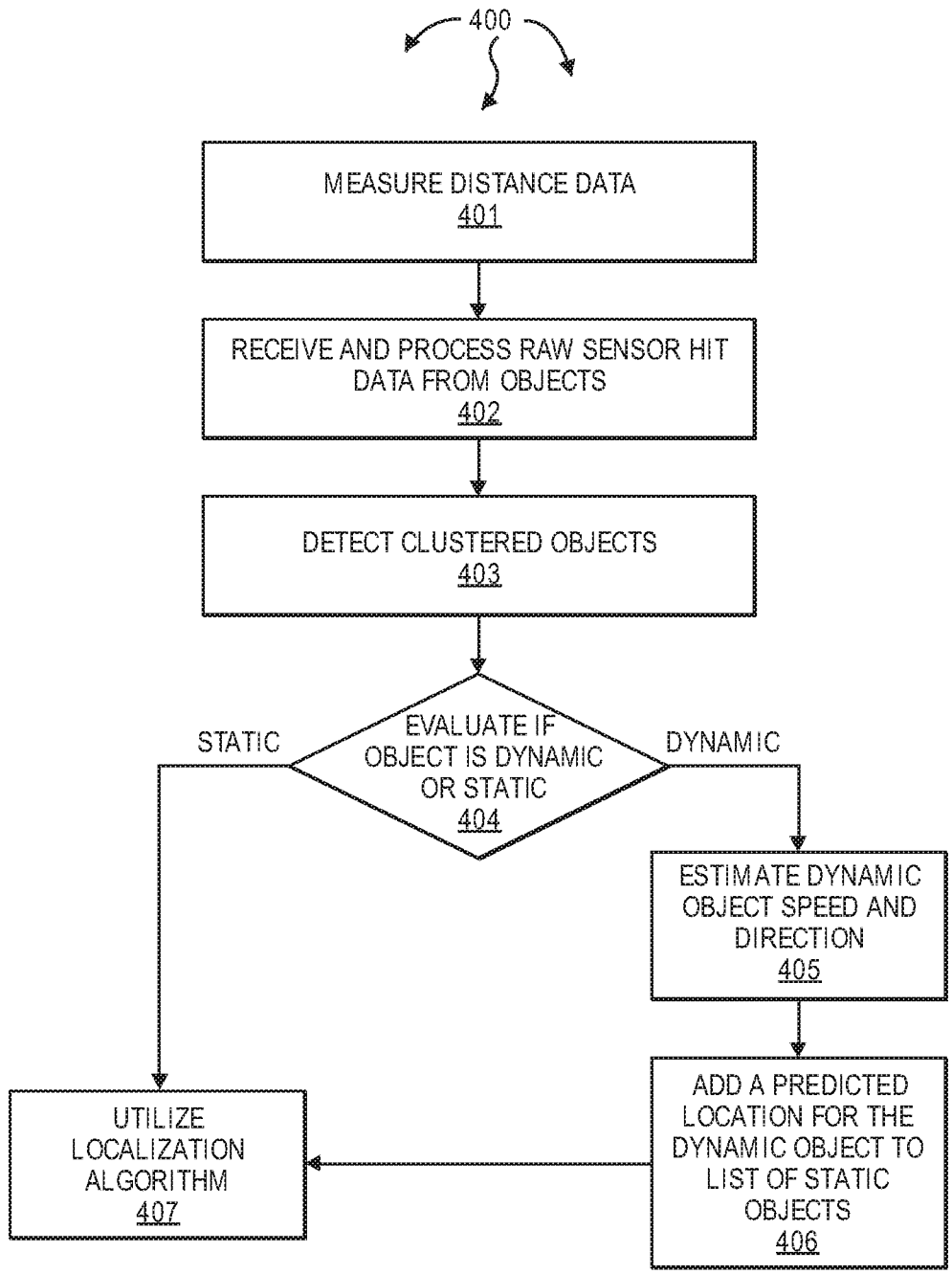
FIG. 4 illustrates another flow chart of an example method for tracking objects within a dynamic environment for improved localization.

FIG. 4 illustrates another flow chart 400 of an example method for tracking objects within a dynamic environment for improved localization. Various components in vehicle 200 can interoperate to implement method 400.

Method 400 includes measuring distance data (401). For example, one or more of sensors 211 can measure distances to other objects within and/or around the portion of roadway where vehicle 200 is traveling. Sensor data from the one or more sensors can be combined in sensor data 221. Method 400 includes receiving and processing sensor hit data from objects (402). For example, sensor data evaluation module 232 can receive and process sensor data 221.

Method 400 includes detecting clustered objects (403). For example, based on sensor data 221, estimation module 233 can detect clusters of static and/or dynamic objects within and/or around the portion of roadway where vehicle 200 is traveling. Method 400 includes evaluating if an object is dynamic or static (404). For example, for each object in a cluster, estimation module 233 can determine if the object is static or dynamic. Method 400 includes estimating speed and direction for dynamic objects (405). For example, for each dynamic object within and/or around the portion of roadway where vehicle 200 is traveling, estimation module 233 can estimate the speed and direction for the dynamic object. Method 400 includes adding a predicted location for the dynamic object to list of static objects (406). For example, estimation module 233 can add a predicted location for each dynamic object to a list of locations for static objects. As such, for a specified future time, the location of any objects within and/or around the portion of roadway where vehicle 200 is traveling can be estimated.

Method 400 includes utilizing a localization algorithm (407). For example, localization module 234 can utilize a localization algorithm to localize vehicle 200 within and/or around the portion of roadway where vehicle 200 is traveling. Vehicle 200 can be localized based on estimated locations for any objects within and/or around the portion of roadway where vehicle 200 is traveling at the specified future time.

Figure 5:
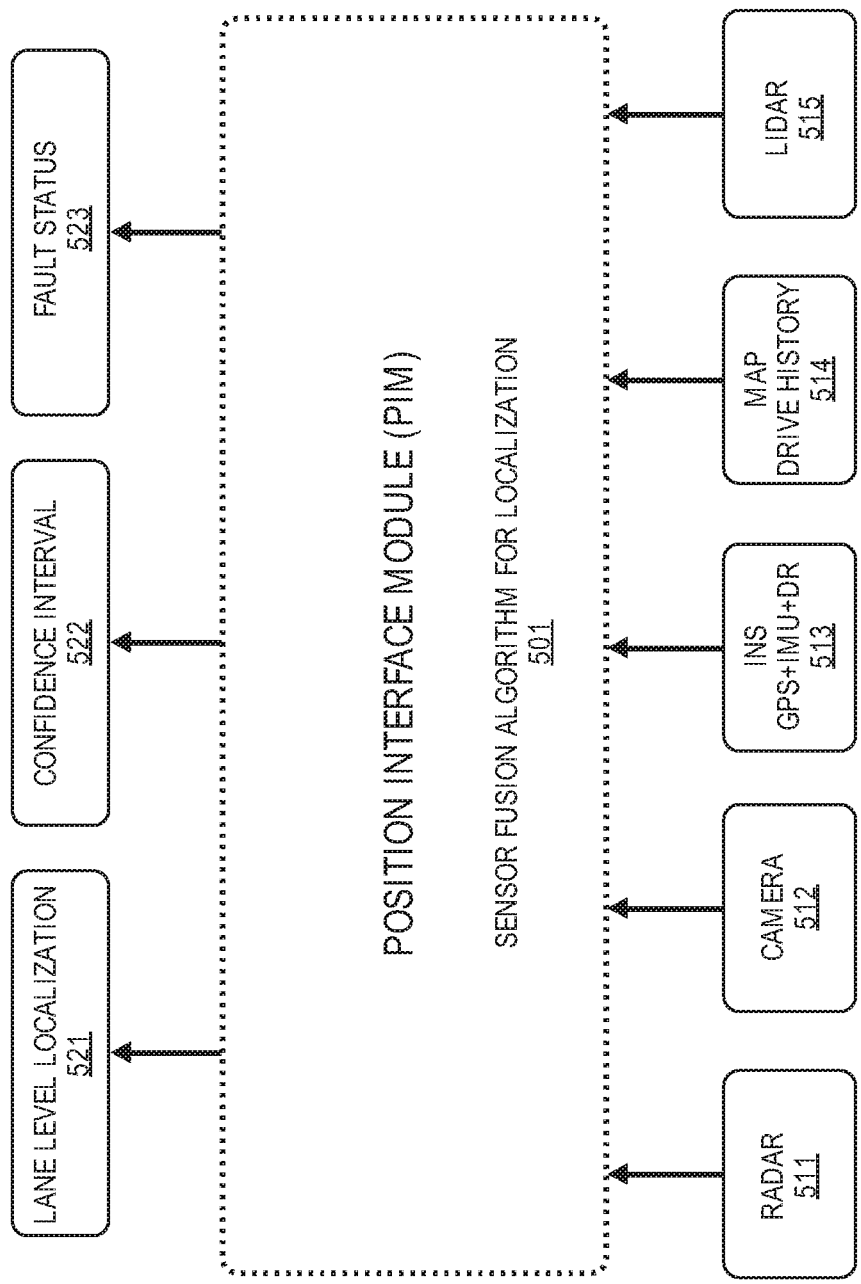
FIG. 5 illustrates an example position interface module.

FIG. 5 illustrates an example position interface module 501. Position interface module 501 can receive sensor data from a variety of different vehicle sensors at a vehicle, including any of: a radar 511, a camera 512, INS (GPS+IMU+DR) 513, a map drive history 514, and a LIDAR 515. Position interface module 501 can use a sensor fusion algorithm to localize the vehicle in an environment based on received sensor data. Localization of the vehicle can be represented by a lane level localization 521, a confidence interval 522, and a fault status 523. Lane level localization 521 can localize the vehicle to a specified roadway lane within some margin of error (e.g., 0.5 m-2 m). Confidence interval 522 can indicate how confident position interface module 501 is in lane level localization 521. Fault status 523 can indicate if position interface module 501 experienced a fault during determination of lane level localization 521.

Figure 6:
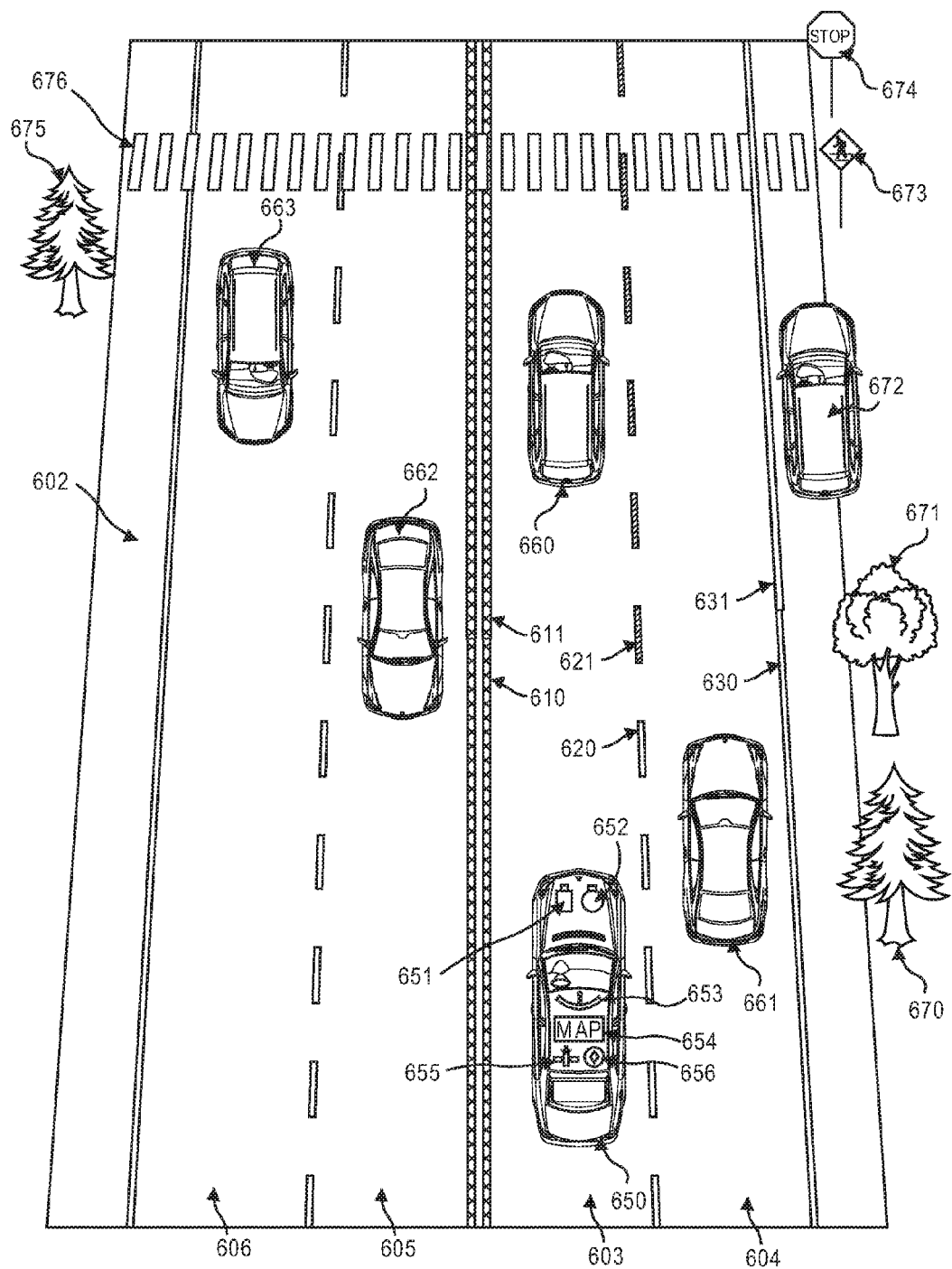
FIG. 6 illustrates a portion of a roadway.

FIG. 6 illustrates a portion of a roadway 602. As depicted, roadway 602 includes lanes 603, 604, 605, and 606. Roadway 602 includes a number of static objects including trees 670, 671, and 675, signs 673 and 674, and a parked vehicle 672. Roadway 602 also includes moving vehicles 650, 660, 661, 662, and 663. As depicted, vehicles 660 and 661 are traveling in essentially the same direction as vehicle 650. On the other hand, vehicles 662 and 663 are traveling in essentially the opposite direction of vehicle 650. Roadway 602 also includes cross-walk 676.

Vehicle 650 includes a variety of sensors including an image capture device 651, a LIDAR system 652, a radar system 653, a map 654, a GPS 655, and an Inertial Measurement Unit (IMU) 656. Vehicle 650 can also include a computer system similar to vehicle computer system 201 and/or a position interface module similar to position interface module 231 and/or position interface module 501.

As vehicle 650 moves within lane 603, the sensors can detect the other static objects and the other dynamic objects on roadway 602. The sensors can also detect the lane markings for lane 602 including lane markings 610, 620, and 630. As vehicle 650 proceeds, lane markings for lane 602 can degrade and become less visible as indicated by lane markings 611, 621, 631.

In response to degraded lane markings, vehicle 650 can predict the location of vehicles 660, 661, 662, and 663 on roadway 602 at a future point in time. Vehicle 650 can combine the predicted future locations of vehicles 660, 661, 662, and 663 with the locations of trees 670, 671, and 675, signs 673 and 674, and parked vehicle 670 to estimate the environment of roadway 602 at the future point in time. Vehicle 650 can use the estimated environment to compensate for the degradation of lane lines 611, 621, and 631, such as, for example, maintaining vehicle 650 in a safe configuration.

For example, if vehicle 650 predicts that vehicle 660 is essentially at the same distance straight in front of vehicle 650 at the future point time, vehicle 650 has some level of confidence that it can safely remain in lane 603 if maintaining a current configuration. If vehicle 650 predicts that vehicle 660 is at a lesser distance straight in front of vehicle 650 at the future point time, vehicle 650 has some level of confidence that it can safely remain in lane 603 if it reduces speed. Depending on other predicted future locations of dynamic and static objects in roadway 602, vehicle 650 can change to a safe configuration in other ways, such as, for example, changing direction, accelerating, coming to a complete stop, etc.

Although the components and modules illustrated herein are shown and described in a particular arrangement, the arrangement of components and modules may be altered to process data in a different manner. In other embodiments, one or more additional components or modules may be added to the described systems, and one or more components or modules may be removed from the described systems. Alternate embodiments may combine two or more of the described components or modules into a single component or module.

The foregoing description has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the invention.

Further, although specific embodiments of the invention have been described and illustrated, the invention is not to be limited to the specific forms or arrangements of parts so described and illustrated. The scope of the invention is to be defined by the claims appended hereto, any future claims submitted here and in different applications, and their equivalents.

What is claimed:

1. A method comprising:
capturing first sensor data associated with a moving object within an environment at a first time;
capturing second sensor data associated with the moving object within the environment at a second time, the second time subsequent to the first time;
detecting that the second sensor data indicates a degraded perception of the moving object relative to the first sensor data;
based at least in part on the degradation, estimating a current location of the moving object within the environment from the first sensor data, including:
estimating a position of the moving object from the first sensor data,
estimating a velocity of the moving object from the first sensor data, and
calculating the current location from the estimated position, the estimated velocity, and an elapsed time since the first sensor data was captured; and
controlling a configuration of a vehicle within the environment based on the estimated current location of the moving object.

2. The method of claim 1, wherein detecting that the second sensor data indicates a degraded perception of the moving object relative to the first sensor data comprises detecting that second sensor data indicates a degraded perception of another vehicle relative to the first sensor data.

3. The method of claim 2, wherein detecting that the second sensor data indicates a degraded perception of the moving object relative to the first sensor data comprises detecting that sensor data associated with lane lines on a roadway indicates that the lane lines have become degraded or obscured; and wherein estimating a current location of the moving object within the environment comprises, based at least in part on degradation of the lane lines, estimating the current location of the other vehicle from the first sensor data.

4. The method of claim 1, further comprising localizing the vehicle within the environment based on a static object in the environment.

5. The method of claim 4, wherein localizing the vehicle within the environment comprises localizing the vehicle within the environment within a specified confidence interval.

6. The method of claim 4, wherein controlling a configuration of the vehicle comprises calculating the configuration of the vehicle to maintain safe operation of the vehicle.

7. The method of claim 1, wherein controlling a configuration of the vehicle comprises controlling the configuration of the vehicle within a roadway environment.

8. The method of claim 1, wherein controlling a configuration of the vehicle comprises controlling one or more of: acceleration, speed, or direction for the vehicle.

9. The method of claim 1, wherein controlling a configuration of the vehicle comprises utilizing a vehicle control system to place the vehicle in a safe configuration.

10. A computer system, the computer system comprising:
one or more processors;
system memory coupled to the one or more processors, the system memory storing instructions that are executable by the one or more processors; and
the one or more processors executing the instructions stored in the system memory to perform the following:
capture first sensor data associated with a moving object within an environment at a first time;
capture second sensor data associated with the moving object within the environment at a second time, the second time subsequent to the first time;
detect that the second sensor data indicates a degraded perception of the moving object relative to the first sensor data;
based at least in part on degradation, estimate a current location of the moving object within the environment from the first sensor data including:
estimate a position of the moving object from the first sensor data,
estimate a velocity of the moving object from the first sensor data, and
calculate the current location from the estimated position, the estimated velocity, and an elapsed time since the first sensor data was captured; and
control a configuration of a vehicle within the environment based on the estimated current location of the moving object.

11. The computer system of claim 10, further comprising the one or more processors executing the instructions stored in the system memory to estimate that the moving object is traveling in essentially the opposite direction as the vehicle on a roadway.

12. The computer system of claim 10, wherein the one or more processors executing the instructions stored in the system memory to detect that the second sensor data indicates a degraded perception of the moving object comprises the one or more processors executing the instructions stored in the system memory to detect that the second sensor data indicates degraded perception of another vehicle moving relative to first sensor data.

13. The computer system of claim 12, wherein the one or more processors executing the instructions stored in the system memory to detect that the second sensor data indicates a degraded perception of the moving object comprises the one or more processors executing the instructions stored in the system memory to detect that sensor data associated with lane lines on a roadway indicates that the lane lines have become degraded; and wherein the one or more processors executing the instructions stored in the system memory to estimate a current location of the moving object within the environment comprises the one or more processors executing the instructions stored in the system memory to, based at least in part on degradation of the lane lines, estimate the current location of the other vehicle from the first sensor data.

14. The computer system of claim 10, further comprising the one or more processors executing the instructions stored in the system memory to localize the vehicle within the environment within a specified confidence interval.

15. The computer system of claim 10, wherein the one or more processors executing the instructions stored in the system memory to control a configuration of the vehicle comprises the one or more processors executing the instructions stored in the system memory to control one or more of: vehicle acceleration, vehicle speed, or vehicle direction.

16. The computer system of claim 10, wherein the one or more processors executing the instructions stored in the system memory to control a configuration of the vehicle comprises the one or more processors executing the instructions stored in the system memory to indicate that there was a fault in controlling the configuration of the vehicle.

17. The computer system of claim 10, further comprising the one or more processors executing the instructions stored in the system memory to:
create a map of the environment based on at least one of: a roadway lane marking or geographic location of the vehicle; and
determine a position of the moving object on the map based on the estimated location for the moving object.

18. A method comprising:
capturing first sensor data associated with lane lines on a roadway at a first time;
capturing second sensor data associated with the lane lines on the roadway at a second time, the second time subsequent to the first time;
detecting that the second sensor data indicates the quality of the lanes lines has degraded relative to the quality of the lanes lines indicated in the first sensor data;
based at least in part on the lane line quality degradation, estimating a current location of another vehicle within the roadway from the first sensor data including:
estimating a position of the other vehicle from the first sensor data,
estimating a velocity of the other vehicle from the first sensor data, and
calculating the current location from the estimated position, the estimated velocity, and an elapsed time since the less recent sensor data was captured; and controlling a configuration of a vehicle within the roadway based on the estimated current location of the other vehicle.

19. The method of claim 18, furthering comprising indicating that there was a fault in controlling the configuration of the vehicle.

20. The method of claim 18, further comprising:
creating a map of the roadway based on at least one of: a lane line or a geographic location of the other vehicle; and
determining a position of the other vehicle on the map based on the estimated location for the other vehicle on the roadway.

* * * * *